Aug. 11, 1953     L. G. KOPP     2,648,362

METHOD OF MAKING RAKE TEETH

Original Filed Oct. 16, 1948

INVENTOR.
LESTER G. KOPP
BY *Carlson, Pitzner,*
*Hubbard + Wolfe*
ATTORNEYS

Patented Aug. 11, 1953

2,648,362

UNITED STATES PATENT OFFICE 2,648,362

METHOD OF MAKING RAKE TEETH

Lester G. Kopp, South Bend, Ind., assignor to Harry Ferguson, Inc., Detroit, Mich., a corporation of Delaware Original application October 16, 1948, Serial No. 54,885. Divided and this application August 30, 1950, Serial No. 182,279

1 Claim. (Cl. 144—309)

This application is a division of my copending application Serial No. 54,885, filed October 16, 1948, now Patent No. 2,558,095.

The present invention pertains generally to agricultural implements such as buck rakes and the like. More specifically, the invention relates to a novel method of making teeth for the raking units of such implements.

In the operation of implements such as buck rakes, the tines or teeth thereof are frequently subjected to severe vertical and lateral stresses. To be satisfactory, such teeth must possess sufficient strength to withstand these stresses and yet their weight must not be so large that the assembled rake becomes unwieldy. These considerations are of great importance in the design of large rakes of the type used with tractors where, for example, the teeth might average about ten feet in length.

One object of the invention is to provide a novel method of making light, rugged teeth which will have particular, but by no means exclusive utility, in connection with relatively large buck rakes.

Another object is to provide a novel and economical method of producing teeth of the foregoing type from common sizes of timber.

Further objects and advantages will become apparent as the following description proceeds, taken in connection with the accompanying drawings, wherein.

Figure 2:
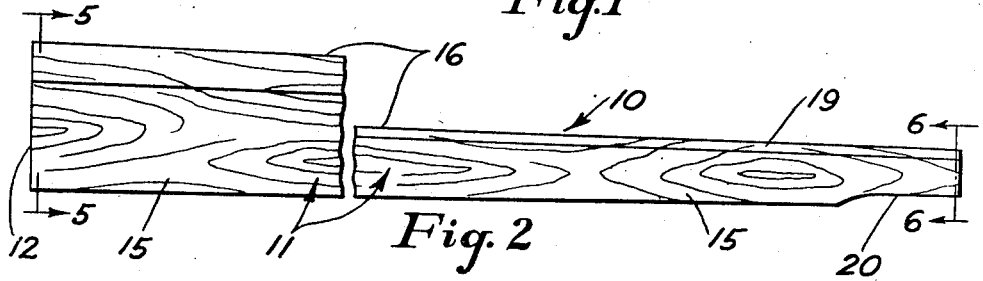
Fig. 2 is an enlarged side elevational view of an illustrative tooth made in accordance with the method of the present invention, the central portion of such tooth being broken away also for convenience in illustration.
Figure 5:
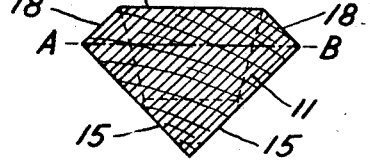
Figure 6:
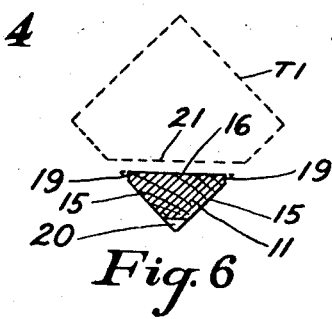

Figs. 5 and 6 are enlarged transverse sectional views through the end portions of the tooth of Fig. 2, such views being taken in the planes of the lines 5—5 and 6—6 respectively of Fig. 2.

Figure 3:
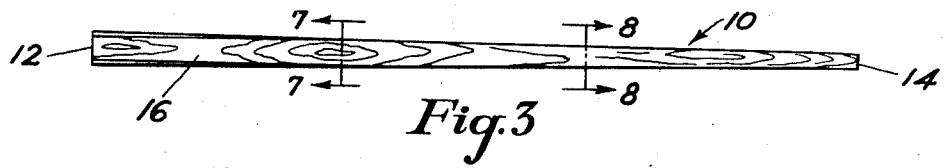
Figs. 3 and 4 are respective plan and side elevational views of the tooth shown in Fig. 2, but drawn to a smaller scale.
Figure 7:
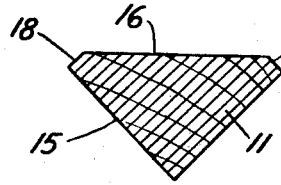
Figure 8:
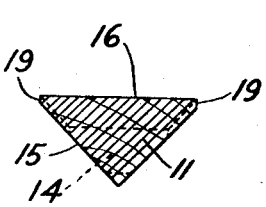

Figs. 7 and 8 are enlarged transverse sectional views through intermediate portions of the tooth of Fig. 2, taken respectively in the planes of the lines 7—7 and 8—8 in Fig. 3.

While the invention is susceptible of various modifications and alternatives, a preferred mode of practicing the novel method has been illustrated in the drawings and will be described below in considerable detail. It should be understood, however, that there is no intention to limit the invention to the specific mode disclosed, but on the contrary, the intention is to cover all modifications and alternatives falling within the spirit and scope of the invention as expressed in the appended claim.

Referring more particularly to the drawings, there is shown an illustrative rake tooth 10 made in accordance with the method of the present invention, being formed as an elongate bar having a body portion 11 of varying cross section and tapering gradually from a root end 12 to a tip end 14. Preferably, the tooth 10 is made of relatively strong and fairly resilient timber such as long leaf pine or fir. In the present instance, the underside of the tooth 10 is given a wide V-shape, being defined by means of a pair of mutually perpendicular longitudinal face portions 15 of approximately equal area. Disposed opposite the under face portions 15 and running longitudinally of the tooth 10 is a chamfered upper face portion 16 lying in a plane inclined at an angle to the line of intersection between the under faces 15 and also inclined at an angle to the longitudinal axis of the tooth 10. Located on either side of the face portion 16 and running between the root end 12 and an intermediate point on the illustrative tooth 10 are secondary face portions 18 which intersect the under face portions 15 at right angles. The secondary face portions 18 gradually taper toward the tip end 14 of the tooth due to the inclination of the upper face portion 16, eventually merging with a pair of narrow vertical flats 19.

Figure 1:
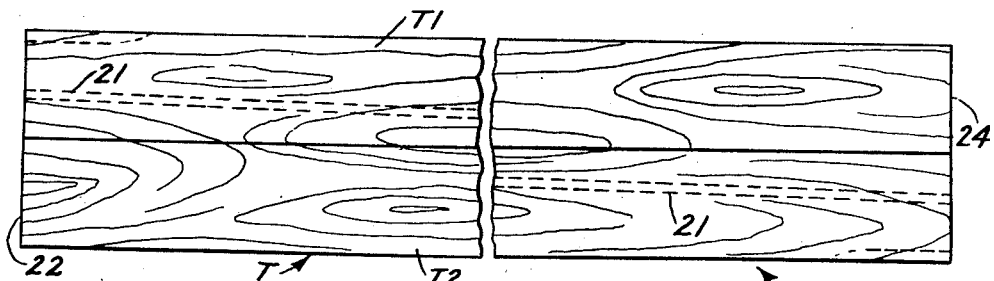
Figure 1 is an enlarged side elevational view of a piece of stock with indications of the manner in which the latter is cut to produce the teeth disclosed herein, the central portion of the stock having been broken away merely for convenience in illustration.
Figure 4:
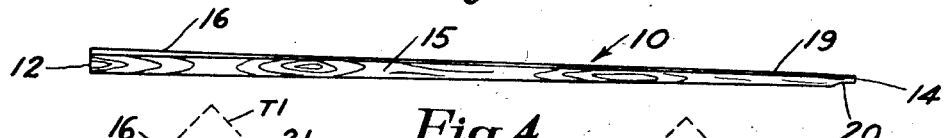

To minimize any tendency for the tip end 14 to splinter upon contact with the ground, the sharp edge between the under surfaces 15 of the tooth is relieved in that vicinity as by means of a short chamfered area 20 (Figs. 1, 4 and 6). Due to its proximity to the unsupported end of the tooth, a substantial amount of stock may be removed at the area 20 without a perceptible reduction in tooth stiffness.

Turning once more to Figures 4 to 8, inclusive, it can now be appreciated by those skilled in the art that the foregoing construction results in a tapered tooth having substantial strength which is achieved without an undue increase in the weight of the tooth. This is due in no small measure to the fact that a substantial portion extending outwardly from the root end of the tooth is formed with a five-sided polygonal cross section. Such portion possesses greater strength as a cantilever beam than it would otherwise have if formed with a rectangular cross section of equivalent area.

For the purpose of producing rake teeth of the character just described, a novel and economical method of manufacture has been devised wherein there is only an infinitesimal waste of material. The raw material utilized in such methods comprises a timber T of a commercially available size and shape, having a substantially square cross section and a length corresponding to that of a finished tooth. Referring more particularly to Figs. 1 to 4, it will be perceived that a longitudinal saw-cut 21 is made in the timber T, starting at end 22 on a line parallel to but above the horizontal diagonal AB of the end 22. The cut 21 then proceeds along the timber T in a plane downwardly inclined with respect to its longitudinal axis, intersecting the general plane of the line AB in the vicinity of the longitudinal center of the timber T. At any point between such intersection and the end 22 of the timber T, the cross section of the latter will be divided by the cut 21 into an upper triangular portion and a relatively larger lower portion complementary thereto, such portion being in the shape of a five-sided polygon. The saw-cut 21 thereupon continues along the same downwardly inclined longitudinal plane, terminating at end 24 of the timber T. Between the intersection of the cut 21 with the plane of the line AB and the end 24, the two complemental cross sectional portions of the timber T will assume an inverted relationship. Thus at any point in this part of the timber T, the lower portion of its cross section will be triangular with the upper portion somewhat larger and assuming the five-sided polygonal shape.

It will now be observed that through the simple expedient of making a single, longitudinally inclined saw-cut, a pair of complementary tapered blanks T1, T2 has been formed from the timber T, the only waste being due to the kerf of the saw. Since the surfaces corresponding to the under faces 15 are already defined by the outer faces of the timber T, each of the blanks T1, T2 can be quickly converted into a finished rake tooth 10 in a few simple additional steps which can be performed in any order. Accordingly, the material adjacent the smaller end of each of the blanks T1, T2 is removed for a short distance along its lower edge as by means of a rotary planing tool to create the relieved area 20. Next, the roughened surface on each blank left by the saw-cut 21 is subjected to a smoothing operation which creates the upper face 16 of the tooth. Finally, the sharp lateral edges of that portion of each blank having the triangular cross section are suitably chamfered, thereby defining the vertical flats 19. Once having been formed, the finished teeth 10 may be coated or otherwise treated with any appropriate preservative.

I claim as my invention:

The method of making rake teeth for an agricultural implement and which comprises sawing a pair of complementary tapered blanks from a relatively long timber having a substantially square cross section and a length many times that of the lateral dimension of said cross section, said length corresponding to that of a finished tooth, subjecting the sawed faces of said blanks to a smoothing operation, relieving the lower edge adjacent the smaller end of each of said blanks, and chamfering the sharp lateral edges of the previously sawed faces of said blanks.

LESTER G. KOPP.

References Cited in the file of this patent

UNITED STATES PATENTS

| Number | Name | Date |
| --- | --- | --- |
| 925,401 | Urquhart | June 15, 1909 |
| 1,588,056 | Rockwell | June 8, 1926 |
| 1,976,171 | Hutchings | Oct. 9, 1934 |